United States Patent [19]

Benjamin et al.

[11] 4,047,829

[45] Sept. 13, 1977

[54] ADJUSTABLE FLOATING REAMER

[75] Inventors: Milton Lloyd Benjamin; Wilbur Nelson Miles, both of Chagrin Falls, Ohio

[73] Assignee: Erickson Tool Company, Solon, Ohio

[21] Appl. No.: 687,667

[22] Filed: May 19, 1976

[51] Int. Cl.$^2$ ............................................. B23B 29/034
[52] U.S. Cl. ..................................... 408/169; 408/171
[58] Field of Search ................. 408/157, 161, 168–171

[56] References Cited

U.S. PATENT DOCUMENTS

| 79,276 | 6/1868 | Sullivan | 408/169 |
|---|---|---|---|
| 218,230 | 8/1879 | Chase | 408/171 |
| 3,728,037 | 4/1973 | Benjamin et al. | 408/168 |

FOREIGN PATENT DOCUMENTS

| 589,954 | 7/1947 | United Kingdom | 408/161 |
|---|---|---|---|
| 701,188 | 12/1953 | United Kingdom | 408/168 |

Primary Examiner—Leonidas Vlachos
Attorney, Agent, or Firm—Donnelly, Maky, Renner & Otto

[57] ABSTRACT

An adjustable floating reamer characterized by its relatively great length and small diameter embodying a closure cap for the diametrically slotted end of a shank member which has a long and thin tubular portion which closely embraces and supports the slotted end of the shank member and which has a closed end in abutting engagement with the slotted end of the shank member to define therewith a rectangular slot in which overlapping reamer blades are slidably supported for radial adjustment and for radial floating movement about a pivot which is spaced a great distance from the blades so that no binding action occurs during the floating movement of the blades during use of the reamer.

4 Claims, 3 Drawing Figures

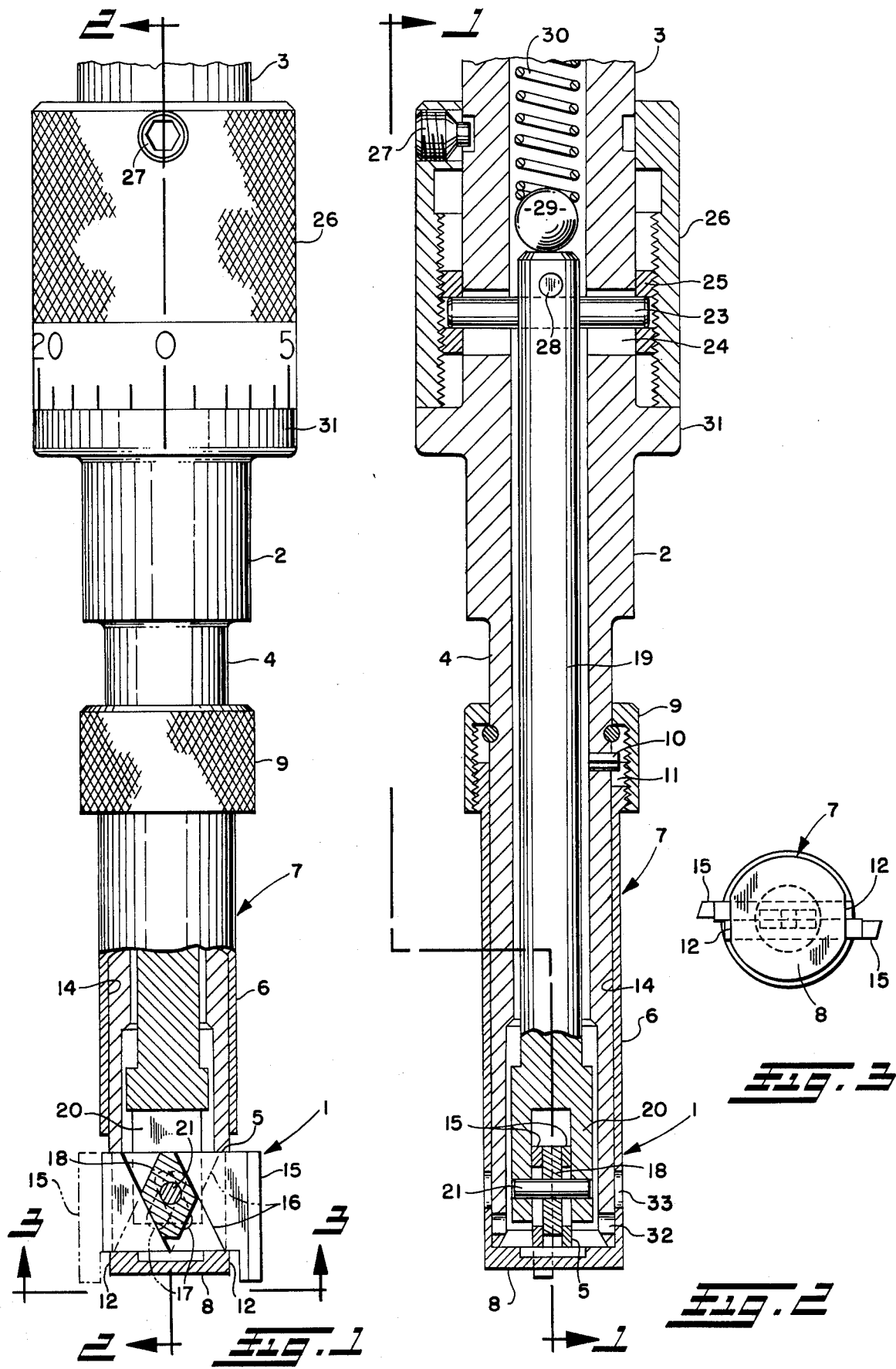

ADJUSTABLE FLOATING REAMER

BACKGROUND OF THE INVENTION

In one known form of adjustable floating reamer as disclosed, for example, in the M. L. Benjamin et al U.S. Pat. No. 3,728,037, the lost in the shank member is closed by a closure cap in the form of a plate which is secured by screws to the end of the shank member and hence the shank member and cap must be of relatively large diameter to provide a wall thickness of metal around the threaded holes in the shank member and around the screw head counterbores in the cap.

Although the adjustable floating reamer of said U.S. Pat. No. 3,728,037 contemplates radial floating movement of the blades such movement is about relatively closely spaced-apart parallel pivots perpendicular to the blade slot.

SUMMARY OF THE INVENTION

An adjustable floating reamer in which the closure cap for the diametrically slotted end of the shank member is in the form of an elongated thin tubular member having diametrically opposed slots through which the reamer blades extend and having an integral closed end which abuts the slotted end of the shank member to form therewith a blade embracing slot in which the blades are accurately guided for radial adjustment, the closure cap closely embracing the shank member and supporting the slotted end thereof against spreading apart by torque load imposed on the reamer blades when in use.

The reamer herein also provides for float of the reamer blades about a low friction rocking pivot which is located a great distance away from the blades so as to eliminate binding action.

Other objects and advantages will appear hereinafter.

BRIEF DESCRIPTION OF THE DRAWING

FIG. 1 is an elevation view partly in cross-section as viewed along the line 1—1, FIG. 2;

FIG. 2 is a longitudinal central cross-section view taken substantially along the line 2—2, FIG. 1; and FIG. 3 is an end view as viewed along the line 3—3, FIG. 1.

DETAILED DESCRIPTION OF A PREFERRED EMBODIMENT

The reamer 1 herein comprises a shank 2 having an upper portion 3 adapted to be secured as in a lathe turret or the like and having a lower elongated tubular portion 4 of length several times its diameter, said portion 4 having a slot 5 diametrically across the lower end. Closely embracing the shank portion 4 is the elongated thin tubular portion 6 of a closure cap 7, said cap 7 having a closed end 9 which is drawn tightly against the lower end of the shank portion 4 to close the slot 5 by means of a nut 9 having threaded engagement with the upper end of the closure cap 7. The closure cap 7 is held against rotation by the pin 10 in the shank portion 4 fitting into a slot 11 in the closure cap 7. The closure cap 7 has opposite flats 12 which in conjunction with the bore 14 form slots through which the overlapping reamer blades 15 extend with clearance. The overlapping blades 15 are closely slidably fitted against the sides and bottom of the slot 5 and against the lower end of the slot 5 as defined by the closed end 8 of the closure cap 7. The juxtaposed faces of the blades 15 are formed with oppositely inclined grooves 16 with slots 17 therethrough, and engaged in the grooves 16 is an axially movable cam block 18 which is in the form of a prism whose bases are slidably engaged with the bottoms of the grooves 16 and whose pairs of parallel lateral faces are engaged with the respective parallel sides of the grooves 16.

The shank 2 is formed with a bore and counterbore to receive with clearance an elongated actuator 19 having a slotted end portion 20 which is connected to the cam block 18 by means of the pin 21 which extends through a hole in the cam block 18 and through the blade slots 17.

The actuator 19 is of very great length as compared with its diameter and adjacent the upper end thereof, a pin 23 extends loosely through a hole in the actuator 19 and through an axial slot 24. The ends of the pin 23 fit in holes in a screw 25 which has threaded engagement with the adjusting sleeve 26, the adjusting sleeve 26 being axially retained by a set screw 27 which has its inner end extending to a peripheral groove of the shank 2. The upper end of the actuator 19 also has a cross pin 28 therethrough which has point contact with the pin 23, and a ball 29 biased by spring 30 exerts force on the actuator 19 tending to maintain the lower end of the adjusting sleeve 26 in frictional engagement with the flange 31.

As apparent, when the adjusting sleeve 26 is rotated in one direction or the other, the resulting downward or upward movement of the actuator 19 causes simultaneous adjustment of the reamer blades 15 radially inwardly or outwardly. In the use of the reamer, a radial inward thrust load on the blades 15 tends to move the actuator 19 downwardly whereby pressure of the cross pin 28 against the pin 23 tends to move the adjusting screw 25 downwardly thus to tightly retain the adjusting sleeve 26 against flange 31.

If the drilled hole in a workpiece is eccentric with respect to the axis of the shank 2, the reamer blades 15 may bodily float horizontally as viewed in FIG. 1 by reason of the clearances between the actuator 19 and slotted portion 20 thereof with the shank portion 4 and such floating will cause low friction rocking of the cross pin 28 on the cylindrical surface of the pin 23 and because of the long radius from pins 28 and 23 to pin 21, the few thousandths of an inch of floating movement will not cause any binding of the blades 15 in the slot 5.

The holes 32 and 33 diametrically through the shank portion 4 and cap 7 are for the purpose of facilitating assembly in placing the pin 21 through the holes in the actuator 19 and cam block 18 and the slots 17 of the blades 15. When that has been done, the actuator 19 and blade 15 assembly together with the closure cap 7 are moved into place into the over the shank portion 4 with the blades 15 slidably engaging the sides of the shank portion slot 5 and when the nut 9 is tightened, the closed end 8 of the closure cap 7 will be pulled tight against the bottom end of the shank portion 4 to close the slot 5 and to closely fit the bottom edges of the overlapping reamer blades 15.

The embodiments of the invention in which an exclusive property or privilege is claimed as defined as follows:

1. An adjustable reamer comprising an elongated slender cylindrical shank member having a slot diametrically across one end; a closure cap having a closed end adjacent said one end and having an integral elongated thin tubular portion having an inside diameter closely embracing said shank member from said one end axially beyond the bottom of said slot; a nut rotatable on said shank member and having threaded engagement with the end of said tubular portion remote from said closed end to tighten said closed end against said one end; a pair of juxtaposed reamer blades radially slidable in said slot as closed by said cap and extending radially through openings in said tubular portion with cutting edges at their outer extremities; said shank member having cam means engaged with said blades to move the latter simultaneously radially inward or outward in opposite directions to adjust the distance between said cutting edges; said tubular portion supporting said shank member against spreading apart of said slot by torque load imposed on said blades at said cutting edges.

2. The reamer of claim 1 wherein said openings are defined by diametrically opposite parallel flats on said cap spaced apart a distance less than the inside diameter of said tubular portion and extending axially from said closed end at least to the bottom of said slot in said shank member.

3. An adjustable reamer comprising an elongated cylindrical shank member having a slot diametrically across on end; a closure cap having a closed end adjacent said one end and having an elongated tubular portion closely embracing said shank member; a nut rotatable on said shank member and having threaded engagement with the end of said tubular portion remote from said closed end to tighten said closed end against said one end; a pair of juxtaposed reamer blades radially slidable in said slot as closed by said cap and extending radially through openings in said tubular portion with cutting edges at their outer extremities; said shank member having cam means engaged with said blades to move the latter simultaneously radially inward or outward in opposite directions to adjust the distance between said cutting edges; said cam means including an elongated actuator axially reciprocable in a bore in said shank member and having one end in camming engagement with said blades and having the other end axially beyond said nut; and screw means rotatable on said shank member and operatively connected with said other end of said actuator to move the latter axially in either direction; said actuator having radial clearance with said shank member bore and a pivotal connection at said other end to permit bodily radial floating movement of said blades when said blades enter a drilled hole in a workpiece which is eccentric with respect to the longitudinal axis of said shank member.

4. The reamer of claim 3 wherein said pivotal connection comprises a cross pin in said other end of said actuator which as a rocking motion on a pin engaged with said screw means and with said actuator.

* * * * *